United States Patent [19]
Hartman

[11] Patent Number: 5,492,032
[45] Date of Patent: Feb. 20, 1996

[54] BOAT WHEEL MOUNTING BRACKET

[76] Inventor: Gerald W. Hartman, 6224 Mary Kitchens Rd., Milton, Fla. 32594

[21] Appl. No.: 291,760

[22] Filed: Aug. 17, 1994

[51] Int. Cl.⁶ .............................. G05G 11/00; B62D 1/14; B62D 1/22
[52] U.S. Cl. .......................... 74/494; 74/480 B; 114/146; 403/167; 403/191
[58] Field of Search .................... 74/480 B, 494, 74/495; 403/167, 168, 191; 114/144 R, 146

[56] References Cited

U.S. PATENT DOCUMENTS

| | | | |
|---|---|---|---|
| 1,351,382 | 8/1920 | Hazelman | 74/495 |
| 1,709,839 | 4/1929 | Chittenden et al. | 74/495 X |
| 1,825,240 | 9/1931 | Miller | 114/144 R X |
| 2,309,159 | 1/1943 | Binger | 74/480 B X |
| 2,365,490 | 12/1944 | Pieron | 114/144 R |
| 2,543,553 | 2/1951 | McAllister | 114/144 R X |
| 3,182,523 | 5/1965 | Ambrose | 74/495 |

*Primary Examiner*—Allan D. Herrmann
*Attorney, Agent, or Firm*—George A. Bode; Michael L. Hoelter

[57] ABSTRACT

A steering wheel bracket used to permit the pilot of a marine vessel, such as a sailboat, to steer the vessel from a location remote from the steering wheel. The invention permits the operator to move about the vessel for a better view during such activities as tacking or jibing. It also permits the operator to select between steering methods, i.e. the vessel can be steered via the regular method or it can be a tiller handled vessel. The bracket consists of a first larger block and a second smaller block clamped together around the spoke of and against the inside curvature of the steering wheel. This second smaller block is sized to fit within a notch in the first larger block. One end of a tiller extension removably fits within an opening in the larger block and by using such extension, the operator at the other end of the tiller extension is able to steer the vessel from a remote location.

16 Claims, 2 Drawing Sheets

BOAT WHEEL MOUNTING BRACKET

BACKGROUND OF THE INVENTION

1. Field of the Invention

This invention pertains to an accessory for sailboats and other marine vessels in general and more particularly, to a bracket mounted on the steering wheel which enables the operator of the vessel to steer from a remote location, such as when tacking a sailboat.

2. General Background

Many devices exist that assist the sailor or operator of a sailboat or a motor driven craft to steer the vessel at a location remote from the power source. A typical example of one such device is shown in U.S. Pat. No. 3,259,094, issued to Schuler. According to Schuler, the driver of the vessel can be positioned at a location removed from the engine and yet still control the pivoting of the engine. This is accomplished by a cable and a series of pulleys around which the cable passes. By turning the steering column, the cable is wound/unwound from the steering column and respectively moved across a pulley adjacent the engine. A series of spring connectors maintain a constant tension on the cable.

A variation of this is shown in U.S. Pat. No. 3,417,723, issued to Akermanis in which the steering column is replaced with a rod-like pivotal arm and the cable is secured directly to the engine. In Akermanis, the spring connectors are secured to a set of pulleys so as to maintain a constant tension on the cable. The rod-like arm is pivoted from side to side thereby tensioning one cable and loosening the other so that the engine can be rotated as desired.

U.S. Pat. No. 2,402,726, issued to Bidwell also discloses a stick-like control rod for controlling the rotation of the tiller. By moving the control rod from side to side, the tiller is likewise moved as desired via a series of cables and pulleys. In this case, the spring connectors that maintain cable tension form a part of the control rod mechanism.

U.S. Pat. No. 3,559,612, issued to Patterson also discloses a control rod mechanism secured directly to a large pulley. By pivoting the control rod, the cable is wound/unwound from around the pulley thereby causing the engine to be rotated as desired. Thus, the operator of the vessel may position him/herself adjacent a side of the vessel and the control rod can be stored in an inoperative position below the top edge of the gunwale so as to provide access to this side of the vessel.

U.S. Pat. No. 2,514,467, issued to Black discloses both a steering column and a throttle control rod that pivots to control the speed of the engine. Both systems incorporate cables and pulleys for their respective operation.

U.K. Pat. No. 17,309, discloses a foot brake attached to the steering wheel of the vessel which enables the helmsman to brake or stop the wheel from either side of the wheel. It incorporates a pair of inter-connected foot levers that are secured to the steering wheel via an elongated rod. By pressing down on one of the foot levers, the rod is tensioned thereby restricting the further rotation of the wheel.

U.S. Pat. No. 2,497,127, issued to Lecarme discloses an aircraft control device that incorporates a series of pivotal rods that permit the pilot to operate multiple aircraft controls from a single mechanism.

While each of the above devices may be suitable for their intended purpose, it is a feature of this invention to provide a means of securing an extension arm to a steering wheel of such a vessel, and preferably sailboats, so as to enable the pilot to steer the vessel at a location remote from the steering wheel. A further feature of this invention is to provide a quick-release means of securing the extension arm to the bracket as well as a quick-release means of attaching the bracket to the steering wheel.

Still another object of this invention is to permit the pilot to quickly change positions thereby enabling him/her to steer from either side of the steering wheel depending on need.

Yet another object of this invention is to permit the pilot to select between a regular method of steering and a tiller handled method of steering.

As a result of this invention, the pilot, when sailing, can tack or turn the sailboat from a position adjacent a side of the vessel while still maintaining control of the vessel. Consequently, this invention permits the pilot to move from behind the steering wheel during tacking or when a better view is desired (i.e. one not blocked by a sail or the like). These and other objects and advantages of this invention will become obvious upon further investigation.

SUMMARY OF THE PRESENT INVENTION

The preferred embodiment of the apparatus of the present invention solves the aforementioned problems in a straightforward and simple manner. What is disclosed is a steering wheel bracket that is mounted to the spoke of a steering wheel of a marine vessel. This bracket consists of a first larger block which is configured having at least one concave side that is also curved to fit against and engage the inside of the steering wheel. This larger block also incorporates a first elongated groove sized to accept the spoke of the steering wheel therein. It further incorporates a tiller opening for the insertion of a tiller extension therein. The above steering wheel bracket also consists of a second smaller block that is configured having at least one concave side that is also curved to fit against and engage the inside of the steering wheel. This smaller block also incorporates a second elongated groove sized to accept the spoke of the steering wheel therein. Furthermore, steering wheel bracket incorporates a clamping assembly used to clamp the first and second blocks together around the spoke and against the steering wheel.

BRIEF DESCRIPTION OF THE DRAWING

For a further understanding of the nature and objects of the present invention, reference should be had to the following description taken in conjunction with the accompanying drawing in which like parts are given like reference numerals and, wherein.

DETAILED DESCRIPTION OF THE PREFERRED EMBODIMENT

Figure 6:
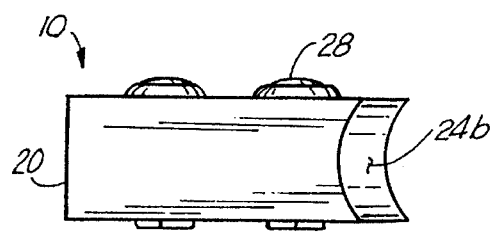
FIG. 6 is a bottom plan view of the embodiment of FIG. 1 in its fully assembled state.
Figure 7:
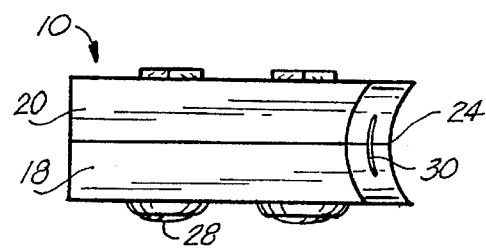
FIG. 7 is a top plan view of the embodiment of FIG. 1 in its fully assembled state.
Figure 3:
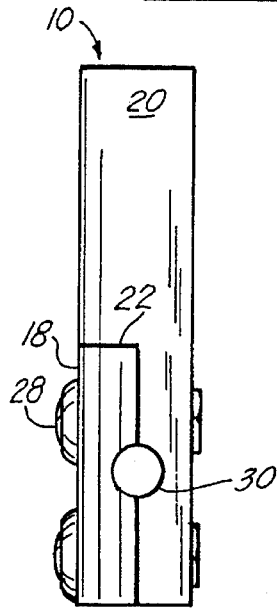
FIG. 3 is a left side elevational view of the embodiment of FIG. 1 in its fully assembled state.
Figure 4:
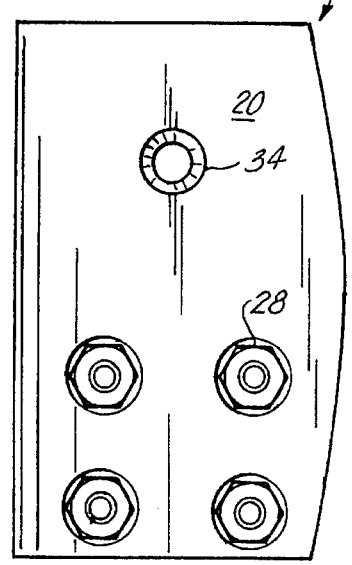
FIG. 4 is a rear elevational view of the embodiment of FIG. 1 in its fully assembled state.
Figure 5:
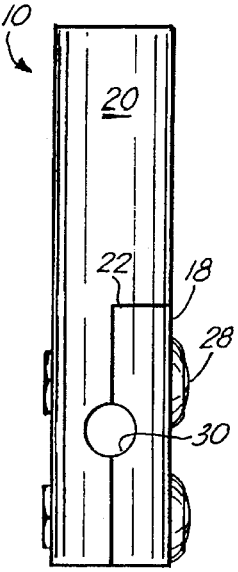
FIG. 5 is a right side elevational view of the embodiment of FIG. 1 in its fully assembled state.
Figure 8:
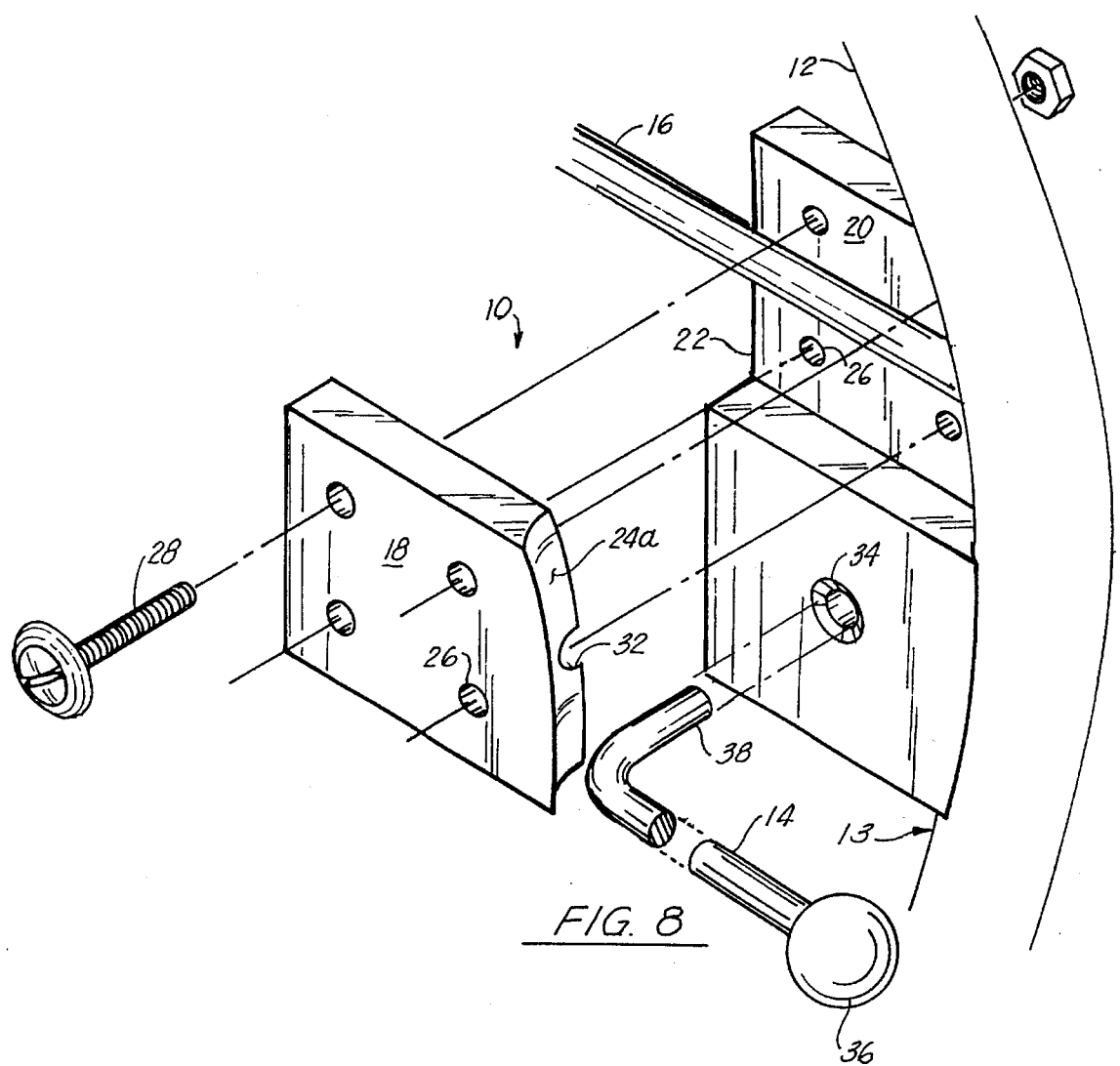
FIG. 8 is an exploded pictorial view of the embodiment of FIG. 1 illustrating its attachment to a steering wheel.
Figure 9:
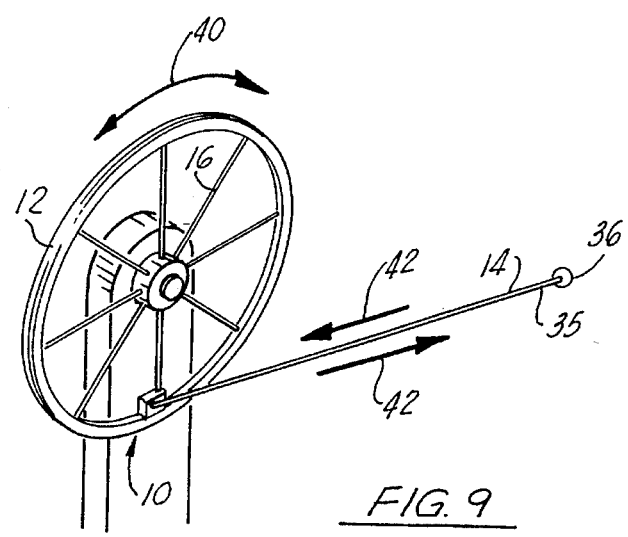
FIG. 9 is a pictorial view of the embodiment of FIG. 1 illustrating its operation.

Referring to the drawing, particularly FIGS. 1–7, there is illustrated steering wheel bracket 10. Generally, elongated bracket 10 is secured against the inside curvature of steering wheel 12 of a sailboat, but it may also be secured to the steering wheel of any other type of vessel if so desired. Bracket 10 permits a tiller extension 14, best seen in FIG. 9, to be mounted to steering wheel 12, thereby permitting the pilot of the vessel to steer the vessel from a remote location. As shown in FIGS. 8 and 9, bracket 10 surrounds and also clamps against one spoke 16 of steering wheel 12.

Bracket 10 consists primarily of two separable members or blocks 18 and 20. As indicated in FIGS. 1–7, it is desirable for smaller block 18 to fit within notch 22 of elongated larger block 20. The size and configuration of notch 22 can vary as desired, but generally notch 22 is sized so that smaller block 18 will fit flush or snugly within notch 22 so that bracket 10 will function as a unitary device.

Ideally, blocks 18 and 20 will be made of wood, stainless steel, a hard plastic, or any other material which is strong enough to handle relatively large stress loading. It is also desirable for this material to be able to withstand long exposure to the elements should the user desire to permanently secure bracket 10 to steering wheel 12. Generally, however, bracket 10 is removable from steering wheel 12 so that it need not be permanently mounted unless otherwise desired.

Figure 1:
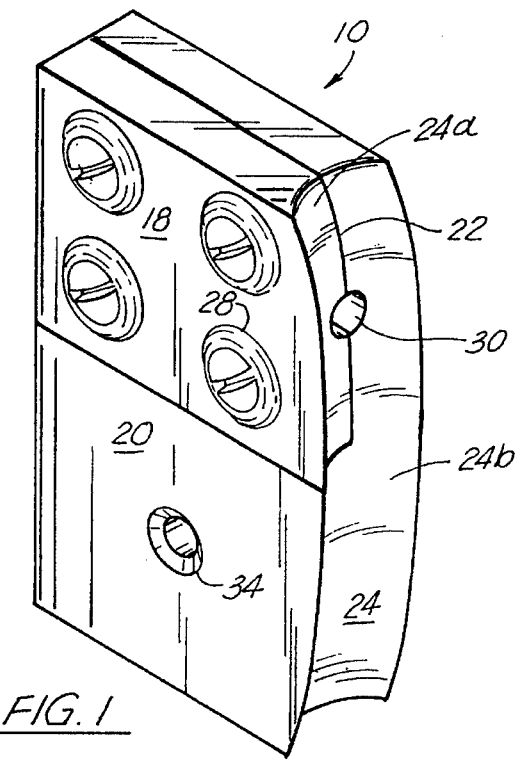
FIG. 1 is a front, top and right side perspective view of the preferred embodiment of the apparatus of the present invention in its fully assembled state.
Figure 2:
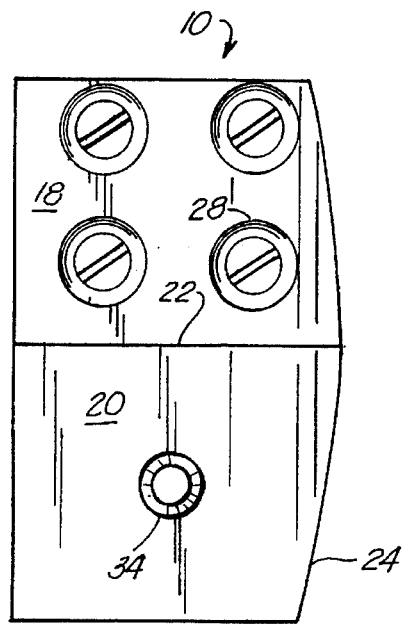
FIG. 2 is a front elevational view of the embodiment of FIG. 1 in its fully assembled state.

As shown in the drawings, common side 24 of both blocks 18 (side 24a) and 20 (side 24b) is curved so as to conform to the curvature of the inside of steering wheel 12. Additionally, as shown in FIGS. 1, 6 and 7, this curved side 24 is also concave or "grooved" so as to accommodate the curvature of wheel 12 as best seen in FIG. 8. Thus, side 24 of bracket 10 is shaped to closely conform to and fit against the inside of steering wheel 12. It is desirable for side 24 to be designed to accommodate a wide variety of steering wheels 12 currently on the market. Of course, any other shape will also suffice so long as bracket 10 can be affixed to steering wheel 12. The shape of the other sides of bracket 10 can be as desired since they normally do not engage any surface or object.

In this preferred embodiment, smaller block 18 is configured with four (4) evenly spaced openings 26 therethrough that are sized to accept bolts 28 therethrough. These openings 26 also extend through notch 22 of larger block 20. A different arrangement or number of openings 26 may be utilized if so desired. In any event, a means of fastening or clamping smaller block 18 to larger block 20 is necessary for the operation of bracket 10 and such a means other than the illustrated nuts and bolts 28 may be used for this.

It is necessary to secure blocks 18 and 20 together because intermediate these blocks 18 and 20 is positioned spoke 16 of steering wheel 12. This spoke 16 fits or is clamped within spoke opening 30 which is formed when two generally identical grooves 32 in each of blocks 18 and 20 are aligned. These grooves 32 are generally semi-circular in shape, but they can also be "V" shaped or any other shape to better grab or wedge spoke 16 therebetween. As best seen in FIGS. 1, 3, 5 and 8, groove 32 of larger block 20 extends within notch 22 and generally transverse to the elongation of larger block 20. By fastening smaller block 18 to larger block 20, spoke 16 is effectively clamped, wedged, compressed, or held therebetween in opening 30. By also securing curved and concave side 24 of bracket 10 against the inside curved surface 13 of steering wheel 12, bracket 10 is further restrained in place by the concave nature of side 24 which will thus prevent bracket 10 from rotating about spoke 16.

A tiller opening 34 is drilled or formed in a region of larger block 20, as best seen in FIGS. 1, 2, 4 and 8, which is removed or distant from smaller block 18 and notch 22. Preferably, tiller opening 34 is tapered, or at least partially tapered, so as to ease the insertion of tiller extension 14 therein. The size of tiller opening 34 is dependent upon the size of tiller extension 14 is used. It is desirable for tiller opening 34 to be designed to accommodate a wide variety of tiller extensions 14 currently on the market. In any event, tiller opening 34 is sized to snugly accept tiller extension 14 therein without much play so as to retain tiller extension 14 therein via friction. However, opening 34 should not be too snug or there will be too much friction to be overcome when either inserting or removing tiller extension 14 from opening 34. Also, tiller extension 14 must be able to rotate within opening 34 during the steering of the vessel so that the pilot can retain extension 14 in a near horizontal position during the steering operation.

In some cases, it may be desirable for there to be a more secure mechanism for securing tiller extension 14 within opening 34 rather than relying solely upon a friction fit. In these cases, such means as a ratchet mechanism and a holding device similar to that found between a socket wrench and a removable socket can be employed to retain tiller extension 14 within opening 34 while still permitting extension 14 to rotate within opening 34 as steering wheel 12 is moved.

During operation, when it is desired to steer the vessel from a location remote from steering wheel 12, the pilot simply inserts tiller extension 14 into tiller opening 34 and then grasps or holds the distal end 35 of tiller extension. This end may incorporate a ball 36 or the like to prevent injury to the pilot and to aid in either pushing or pulling upon extension 14. By thus moving extension 14, which incorporates a bent end region 38 that engages and fits within tiller opening 34, steering wheel 12 can effectively be rotated as shown by ARROWS 40 and 42 from a remote location. However, when the pilot desires to no longer utilize tiller extension 14, bent end region 38 can simply be removed from tiller opening 34 and tiller extension 34 stored. Also, it should be noted that tiller extension 14 can be used from either side of steering wheel 12 and it is a simple matter to move tiller extension 14 from one side of steering wheel 12 to the other.

Ideally, for optimum use of tiller extension 14, bracket 10 is secured at either the top of the bottom of steering wheel 12. This permits the pilot to maximize the range of movement permitted by tiller extension 14 and thus also maximize the rotation of steering wheel 12. When bracket 10 is secured to the top of steering wheel 12, the feel and direction for steering coincide with a regular wheel. However, when bracket 10 is secured to the bottom of steering wheel 12, the steering direction is changed to one that is similar to a tiller handled vessel.

Normally, when sailing or piloting a vessel, the pilot is limited to standing behind steering wheel 12. This limits the visibility of the pilot through the mast, dodger, bimini, etc. Should the pilot choose to sit behind or beside steering wheel 12, the visibility problem is even worse. Thus, by incorporating bracket 12 and tiller extension 14 as described above, such limitations are no longer applicable since the pilot can now move about the vessel or even sit on the rail if such is desired. Furthermore, when racing, bracket 10 and tiller extension 14 enable the skipper to not only move about as needed, but also provides him with a choice as to which steering he desires, i.e. wheel or tiller.

Also, when the pilot or skipper plans a major course change, such as when tacking or jibing, tiller extension 14 can be removed or telescoped down so as to move it out of the way. It can also be removed as indicated above so as not to interfere with this course change or hinder movement about the vessel.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A steering wheel bracket mounted to a spoke of a steering wheel of a marine vessel having a tiller and extension therefor, comprising:

(a) a first block having at least one arcuate and concave side adapted to fit against and engage said steering wheel and having a first elongated groove sized and adapted to accept a spoke of said steering wheel therein, said first block also having an opening therein for the insertion of said tiller extension;

(b) a second block, smaller than said first block, having at least one arcuate and concave side adapted to fit against and engage said steering wheel and having a second elongated groove sized to accept said spoke of said steering wheel therein; and, (c) means for clamping said first and second blocks together around said spoke and against the inner perimeter of said steering wheel.

2. The apparatus as set forth in claim 1, wherein said clamping means are selectively removable.

3. The apparatus as set forth in claim 1, wherein said first larger block is notched with its said groove extending along and within said notch.

4. The apparatus as set forth in claim 3, wherein said first block is elongated and its said groove extends generally transversely to the elongated axis of said first block.

5. The apparatus as set forth in claim 4, wherein said second block fits within said notch of said first block.

6. The apparatus as set forth in claim 5, wherein said second groove is in alignment with said first groove when said second block is mated with said first block, said aligned first and second grooves forming an opening for said spoke therebetween.

7. The apparatus as set forth in claim 6, wherein said spoke opening surrounds said spoke of said steering wheel and wherein said spoke of said steering wheel is wedged between said first and second blocks within said first and second grooves.

8. The apparatus as set forth in claim 7, wherein said first and second blocks are flush with each other when clamped together.

9. The apparatus as set forth in claim 8, wherein said clamping means comprise at least one aligned opening in said first and second blocks through which a fastener is inserted.

10. The apparatus as set forth in claim 9, wherein at least one said aligned opening extends through said notch of said first block.

11. The apparatus as set forth in claim 10, wherein at least one said aligned opening extends orthagonal to said first and second grooves.

12. The apparatus as set forth in claim 11, wherein said fastener comprises a nut and bolt.

13. The apparatus as set forth in claim 11, wherein said tiller opening in said first block is tapered.

14. The apparatus as set forth in claim 13, wherein said tiller opening in said first block retains one end portion of said tiller extension therein via friction.

15. A steering wheel bracket mounted to a spoke of a steering wheel of a marine vessel having a tiller and extension therefor, comprising:

(a) a first block having at least one arcuate and concave side curved to fit against and engage the inside perimeter of said steering wheel and having a first elongated groove sized and adapted to accept a spoke of said steering wheel therein, said first block also having an opening therein for the insertion of one end portion of said tiller extension;

(b) a second block, smaller than said first block, having at least one arcuate and concave side curved to fit against and engage the inside perimeter of said steering wheel and having a second elongated groove sized to accept said spoke of said steering wheel therein; and, (c) means for clamping said first and second blocks together around said spoke and against the inner perimeter of said steering wheel whereby said arcuate and concave sides of each block form a unitary arcuate and concave side of said bracket.

16. A steering wheel bracket mounted to a spoke of a steering wheel of a marine vessel having a tiller and extension therefor, comprising:

(a) a first block having at least one arcuate and concave side curved to fit against and engage the inside perimeter of said steering wheel and having a first elongated groove extending generally perpendicular to said arcuate side and sized to accept a spoke of said steering wheel therein, said first block further having an opening therein for the insertion of one end of said tiller extension;

(b) a second block, smaller than said first block, having at least one arcuate and concave side curved to fit against and engage the inside perimeter of said steering wheel and having a second elongated groove sized to accept said spoke of said steering wheel therein; and, (c) means for removably clamping said first and second blocks together around said spoke and against the inner perimeter of said steering wheel whereby said arcuate and concave sides of each block form a unitary arcuate and concave side of said bracket.

* * * * *